(12) United States Patent
Guzorek

(10) Patent No.: US 6,530,557 B1
(45) Date of Patent: Mar. 11, 2003

(54) WATER SENTRY DRIVE UNIT

(75) Inventor: Steven E. Guzorek, Kinston, NC (US)

(73) Assignee: Field Controls, L.L.C., Kinston, NC (US)

( * ) Notice: Subject to any disclaimer, the term of this patent is extended or adjusted under 35 U.S.C. 154(b) by 0 days.

(21) Appl. No.: 09/832,458

(22) Filed: Apr. 11, 2001

(51) Int. Cl.[7] .............................................. F16K 31/04
(52) U.S. Cl. .................. 251/129.12; 251/248; 251/292; 251/329
(58) Field of Search ........................... 251/294, 129.11, 251/129.12, 129.13, 248, 291, 292, 293, 329

(56) References Cited

U.S. PATENT DOCUMENTS

| | | | | |
|---|---|---|---|---|
| 3,504,886 A | * | 4/1970 | Hulslander et al. | 251/328 |
| 4,193,541 A | * | 3/1980 | Scheidweiler | 251/129.11 |
| 4,313,529 A | * | 2/1982 | Kato et al. | 251/326 |
| 4,541,609 A | * | 9/1985 | Smith | 251/129.11 |
| 4,611,617 A | * | 9/1986 | Hewitt | 251/248 |
| 4,961,538 A | * | 10/1990 | Hewitt | 251/129.12 |
| 5,205,534 A | * | 4/1993 | Giordani | 251/129.11 |
| 5,409,037 A | * | 4/1995 | Wheeler et al. | 251/129.11 |
| 5,687,950 A | * | 11/1997 | Woodcock | 251/129.11 |
| 5,694,960 A | * | 12/1997 | Turk et al. | 251/294 |
| 6,065,735 A | * | 5/2000 | Clark | 251/129.11 |

* cited by examiner

*Primary Examiner*—Henry C. Yuen
*Assistant Examiner*—John Bastianelli
(74) *Attorney, Agent, or Firm*—McDermott, Will & Emery

(57) ABSTRACT

The present invention discloses a motorized drive unit for operating a valve including a gear, a motor, a chain coupling the gear and motor, a housing encasing the motor, gear, and chain, and a rotation limiting piece. Additionally, the present invention discloses a method for mounting a gear to a gate valve handle by providing a gear and a mounting plate, positioning the mounting plate beneath the handle of the gate valve, positioning the gear above the handle of the gate valve, and coupling the mounting plate to the gear. Further, the present invention discloses a method for mounting a gear to a ball valve by providing a gear having a cutout portion, removing the handle from the ball valve stem, placing the second portion of the handle through the cutout portion of the gear, and coupling the handle and the gear to the stem.

16 Claims, 4 Drawing Sheets

WATER SENTRY DRIVE UNIT

FIELD OF THE INVENTION.

The present invention relates generally to a motorized drive unit for operating a valve. Specifically, the present invention relates to a motorized drive unit, utilizing a small torque motor, for operating both gate and ball valves. Further, the present invention relates to a mounting device for coupling the drive unit to a valve such that the valve handle and the drive unit may translate along an axis defined by the valve stem without impairing the operation of the drive unit. In addition, the present invention relates to a first method for mounting the motorized drive unit to a gate valve and a second method for mounting the motorized drive unit to a ball valve.

BACKGROUND OF THE INVENTION

Motorized drive units for operating valves are known in the prior art. One use for motorized drive units has been in automatic programmable water shutoff devices. Automatic programmable water shutoff devices are employed to shut off the flow of water through a plumbing pipe when a preset flow condition is detected in the pipe. Automatic programmable water shutoff devices typically include a motorized drive unit mounted to a valve, a computerized controller for presetting shutoff flow conditions, and a microphone for detecting fluid flow through a pipe. Automatic programmable water shutoff devices typically attach to the main water shutoff valves of residential buildings. There are generally two basic approaches for coupling the motorized drive unit to the valve. The first approach involves removing the handle of the valve and coupling the motor to the valve stem. The second approach involves attaching a gear to the valve stem and utilizing a chain for coupling the gear to the motor. Both of these automatic programmable water shutoff devices have had limited effectiveness for the reasons described below.

First, residential water shutoff valves are generally not manufactured to strict tolerances. Often the valve stem and handle exhibit some degree of motion, in excess of the intended rotation, during the operation of the valve. If the motor of the drive unit has been mounted to the water main, the movement of the valve stem and handle typically impairs the operation of the motor itself or causes the drive unit chain to bunch, bind, or fall off the gear sprockets. In either case, the automatic programmable water shutoff device is thereby disabled.

Second, the relatively small diameter of the typical valve stem requires the use of a high torque motor for automatic programmable water shutoff devices that attach directly to the valve stem. Typically, high torque motors are larger and more expensive than low torque motors. Therefore, using a high torque motor increases the cost of the device as well as increases the space required for installation.

Third, automatic programmable water shutoff devices that used a motor attached directly to the valve stem typically required the use of a valve stem connector to couple the motor to the valve stem. Each given valve stem connector was manufactured to operate for a given range of stem sizes. Additionally, the torque of the motor had to be matched to the particular size of the valve stem. However, as there is no standard stem size for residential water shutoff valves, there was not a standard size valve stem connector and motor. Thus, the consumer had to know the stem size and valve torque prior to purchasing an automatic programmable water shutoff device. The typical homeowner would be more inclined to purchase a product that was adaptable to a greater range of valve stem sizes and torques.

Fourth, prior automatic programmable water shutoff devices could not operate ball valves. A ball valves handle acts as a stop to prevent the valve from over-rotating in either the opening or closing direction. With a ball valve handle attached to a ball valve stem, there is no room for the valve stem connector of prior automatic programmable water shutoff devices to couple to the valve stem. Because ball valves, in addition to gate valves, are commonly used in residential applications, prior automatic programmable water shutoff devices were not adapted for use in a significant number of residential applications.

Fifth, prior automatic programmable water shutoff devices were not easily installed by the typical homeowner. Providing an automatic programmable water shutoff device that is easier for the typical homeowner to install would increase the market potential of such devices.

Accordingly, it would be desirable to provide a motorized drive unit for use in a automatic programmable water shutoff device that (1) is not impaired by the translation of the valve handle and drive unit in the direction of the valve stem, (2) uses a low torque motor, (3) is adaptable to typical valve stem sizes and torques, (4) works with both gate and ball valves, and (5) can easily be installed by the typical homeowner.

SUMMARY OF THE INVENTION

It is one of the principal objectives of the present invention to provide a motorized drive unit that can be installed by the typical homeowner.

It is another objective of the present invention to provide a motorized drive unit for mounting to a gate valve.

It is yet another objective of the present invention to provide a motorized drive unit for mounting to a ball valve.

It is still another objective of the present invention to provide a gear that can be mounted to a valve handle such that a low torque motor may be implemented for operating the valve.

It is a further objective of the present invention to provide a device for coupling a drive unit to the range of valve stem sizes typically used in residential plumbing applications.

It is another objective of the present invention to provide a device for coupling a drive unit to a valve such that translation of the valve handle and drive unit in the direction of the valve stem axis does not impair the operation of the drive unit.

These and other objectives of the present invention will become apparent upon examining the drawings and figures together with the accompanying written description thereof.

DETAILED DESCRIPTION OF THE DRAWINGS

Figure 1:
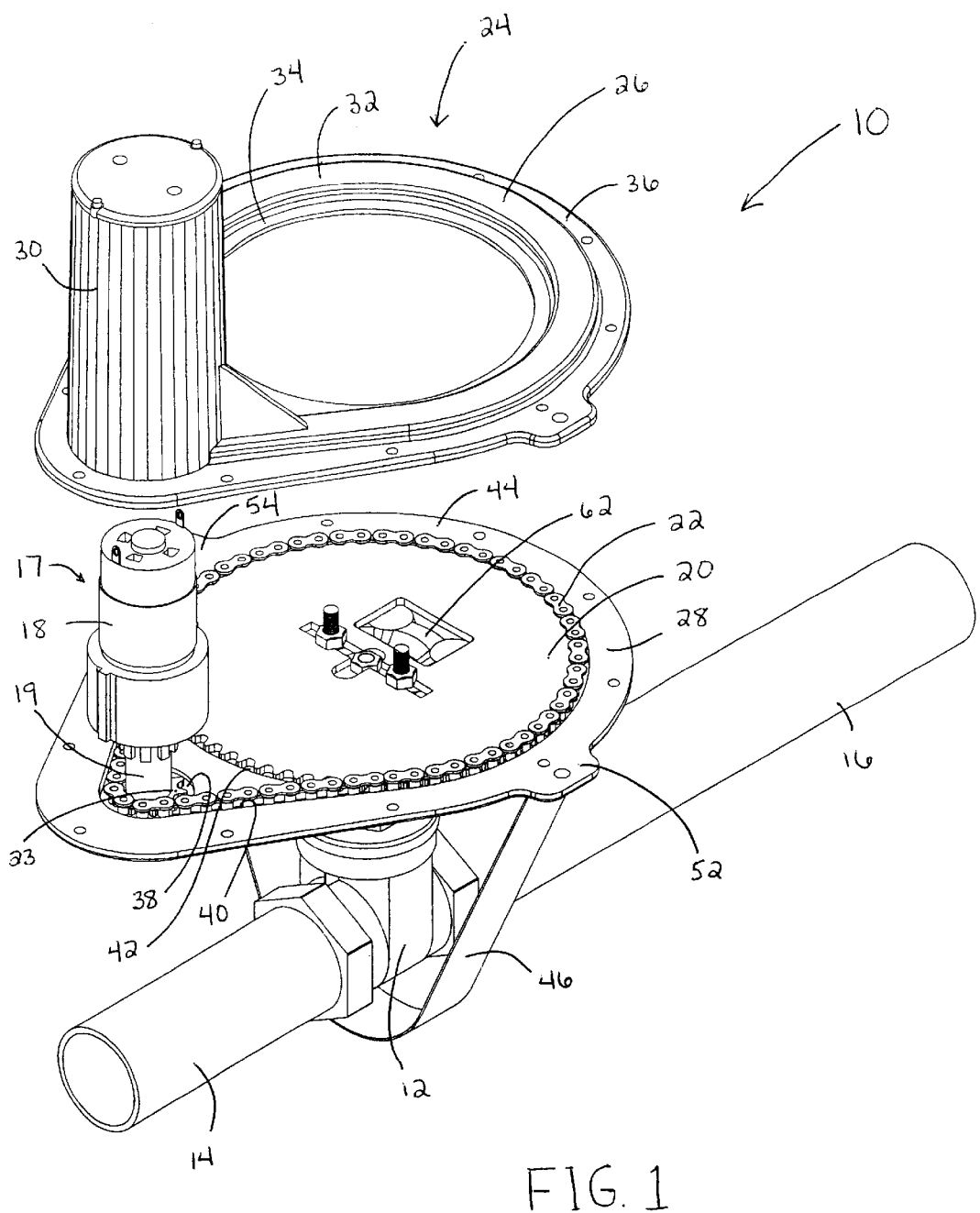
FIG. 1 is a partially exploded perspective view of the motorized drive unit of the present invention mounted to a gate valve using a band support.

Referring to FIG. 1, one embodiment of a motorized drive unit 10 of the present invention is shown. As also shown in FIG. 1, a gate valve 12 is located between an upstream pipe 14 and a downstream pipe 16 through which a fluid may flow. The motorized drive unit 10 is mounted to the gate valve 12 such that it may open and close the gate valve 12 according to instructions it receives from a controller (not shown).

The motorized drive unit 10 of FIG. I has a low torque motor 18 with an axle 19 and drive gear 23. The motor 18 is dual directional, it can rotate in either a clockwise or counter-clockwise direction. The drive gear 23 is coupled to a gear 20 by a chain 22. The gear 20 is coupled to a gate valve handle 62 such that rotation of the gear 20 in a first direction causes the gate valve 12 to open. Rotation of the gear 20 in a second direction causes the gate valve 12 to close. The torque of the motor 18 and the size of the gear 20 are designed to transmit an appropriate level of torque to the gate valve 12 for operation of the gate valve 12.

For example, the motor assembly 17, including the motor 18 and gear box (not shown), produces 30 inch-ounces of torque and can be the motor assembly used in a Skil® brand motorized screwdriver made by S-B Power Tool Company, Chicago, Ill. It uses a 3 volt (approximately), direct current, battery-powered motor 18 such as one manufactured by Johnson Motors of Hong Kong. Alternatively, the motor 18 can be an alternating current motor 18. The gear 20 and motor 18 illustrated in FIG. 1 utilize a gear ratio of approximately 5.6 to 1 to generate approximately 169 inch-ounces of torque through the gear 20. The gear 20 shown in FIG. 1 is constructed from metal, but the gear 20 could be constructed from plastic so long as the gear 20 is capable of being utilized to transmit the torque generated by the motor 18.

A support housing 24, including an upper housing piece 26 and a lower housing piece 28, encases the motor 18, gear 20, and chain 22. The upper housing piece 26 is configured to provide a motor cover 30, an upper chain track 32, an upper gear track 34, and an upper securing portion 36 for attaching the upper housing piece 26 to the lower housing piece 28. The lower housing piece 28 is configured to provide a motor base 38, a lower chain track 40, a lower gear track 42, and a lower securing portion 44 for attaching the lower housing piece 28 to the upper housing piece 26.

In the installation illustrated in FIG. 1, the lower housing piece 28 supports the motor 18, the gear 20, and the chain 22. The motor base 38 supports the motor 18, the lower gear track 42 supports the gear 20, and the lower chain track 40 supports the chain 22. The upper housing piece 26 encloses the motor 18, gear 20, and chain 22 and provides an upper portion for the motor base 38, the lower gear track 42, and the lower chain track 40. Additionally, the motorized drive unit 10 may be installed at angles other than the vertical installation illustrated in FIG. 1. The upper housing piece 26 may provide the primary support for the motor 18, the gear 20, and the chain 22 in these other various mounting configurations. For example, the motorized drive unit 10 may be installed upside down beneath the pipes 14 and 16 if the gate valve 12 is facing in a downward direction.

The support housing 24 shown in FIG. 1 is constructed from injection molded plastic, however, the support housing may be constructed of any material strong enough to support the cantilevered weight of the motor 18, gear 20, and chain 22. For example, a metal, such as zinc, could be used to construct the support housing 24.

A controller (not shown) can be used in conjunction with an input device such as a microphone (not shown) to control the motor 18 of the motorized drive unit 10 as described in U.S. Pat. No. 5,409,037 which is hereby incorporated by reference. The controller may be specially adapted for the particular installation of the drive unit. For example, in a typical residential installation, the motorized drive unit 10 can be coupled to a computerized controller that is in turn coupled to a microphone which is mounted against the downstream pipe 16 to detect water flowing through the downstream pipe 16. In this installation, the drive unit 10 can be mounted to the gate valve 12 where the gate valve 12 is the main water shutoff valve for the residence. The microphone can transmit signals to the computerized controller when water is flowing though the downstream pipe 16. If water flows though the downstream pipe 16 for a period of time in excess of a preset shutoff time registered in the computerized controller, the controller can send a signal to the motor 18 to close the valve 12. Alternatively, pressing a "close" button on the controller can cause the controller to send a signal to the motor 18 to close the valve 12. Similarly, pressing an "open" button on the controller can cause the controller to send a signal to the motor 18 to open the valve 12.

As shown in FIG. 1, an elongated mounting band 46 attaches to a first mounting portion 52 and a second mounting portion 54 of the support housing 24. The band 46 loops around the gate valve 12 or pipes 14 and 16 and the first end of the mounting band 46 attaches to the first mounting portion 52. The second end of the mounting band 46 attaches to the second mounting portion 54. The mounting band 46 does not contact the gate valve 12 or either of the pipes 14 and 16 in the position shown in FIG. 1. In the position shown in FIG. 1, there is approximately one inch between the mounting band 46 and the gate valve 12. By mounting the mounting band 46 around the gate valve 12 and pipes 14 and 16 in this manner, the motorized drive unit 10 is free to translate both downwardly, or towards, the pipes 14 and 16 and upwardly, or away from, the pipes 14 and 16 as the gate valve 12 operates. The space between the mounting band 46 and the gate valve 12 ensures the motorized drive unit 10 will operate properly on residential gate valves 12. The mounting band 46 can be constructed of steel, plastic, aluminum, or other material strong enough to withstand the torque generated by the drive unit 10.

The mounting band 46 limits rotation of the drive unit 10 when the motor 18 operates to rotate the gear 20. For example, when the motor 18 and the gear 20 begin to rotate clockwise, the support housing 24 and mounting band 46 will rotate clockwise as well until the mounting band 46 contacts either of the pipes 14 and 16. Once the mounting band 46 contacts the pipes 14 and 16, the support housing 24 and the mounting band 46 stop rotating and the motor 18 rotates the gear 20 and the gate valve handle 62 clockwise, thus closing the gate valve 12. When the motor 18 turns in the opposite direction, the support housing 24 and the mounting band 46 rotate counter-clockwise until the mounting band 46 contacts either of the pipes 14 and 16. Once the mounting band 46 contacts either of the pipes 14 and 16, the support housing 24 and the mounting band 46 stop rotating and the motor 18 rotates the gear 20 and the gate valve handle 62 counter-clockwise, thus opening the gate valve 12.

Figure 2:
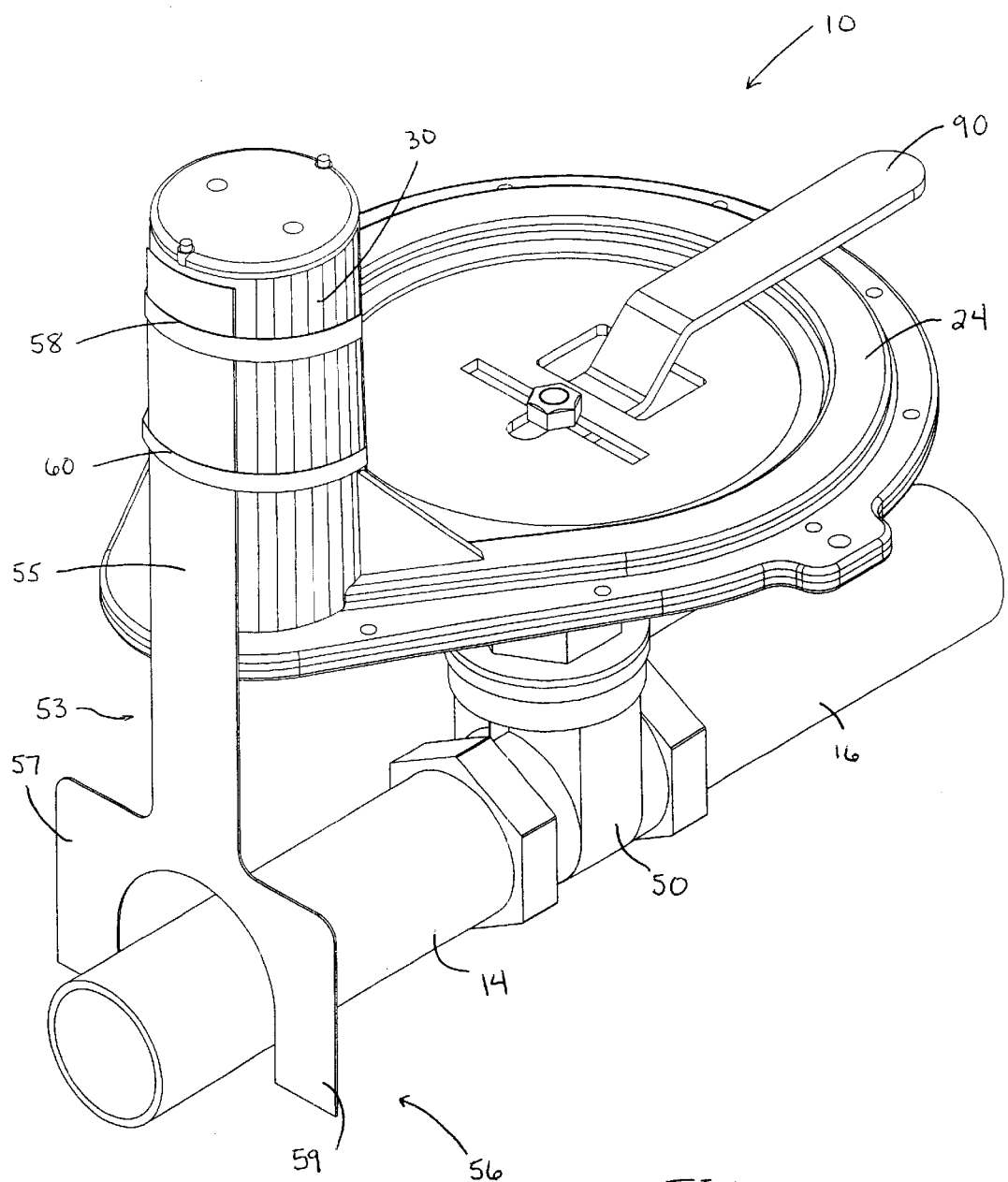
FIG. 2 is a perspective view of the motorized drive unit of the present invention mounted to a ball valve using a fork support.

FIG. 2 illustrates a second embodiment of the motorized drive unit 10 of the present invention. As shown in FIG. 2, the motorized drive unit 10 can alternatively be mounted to a ball valve 50. In addition, a mounting fork 53 can be used to prevent the motorized drive unit 10 from rotating during the operation of the motor 18 instead of the mounting band 46 shown in FIG. 1. The mounting fork 53 shown in FIG. 2 has an elongated support portion 55 integrally formed with a fork portion 56. The elongated support portion 55 is contoured to fit against the curved shape of the motor cover 30. The elongated support portion 55 of the mounting fork 53 is attached to the motor cover 30 of the support housing 24 using a pair of band connectors 58 and 60. The fork portion 56 has a left prong 57 and a right prong 59.

In the position shown in FIG. 2, the fork portion 56 of the mounting fork 53 surrounds the upstream pipe 14 on three sides without contacting the upstream pipe 14. By mounting the left prong 57 and right prong 59 of the fork portion 56 of the mounting fork 53 around the upstream pipe 14 as shown, the motorized drive unit 10 is free to translate both downwards, or towards, the pipes 14 and 16 and upwards, or away, from the pipes 14 and 16 as the ball valve 50 operates. In the example shown in FIG. 2, there is approximately one inch of free space between the mounting fork 53 and the upstream pipe 14. The space between the mounting fork 53 and the upstream pipe 14 ensures the motorized drive unit 10 will operate properly on residential ball valves 50. The mounting fork 53 can be constructed of steel, plastic, aluminum, or other material strong enough to withstand the torque generated by the drive unit 10.

The mounting fork 53 limits rotation of the drive unit 10 when the motor 18 operates to rotate the gear 20. For example, when the motor 18 and the gear 20 begin to rotate clockwise, the support housing 24 and mounting fork 53 will rotate clockwise as well until the right prong 59 of the mounting fork 53 contacts the upstream pipe 14. Once the right prong 59 of the mounting fork 53 contacts the upstream pipe 14, the support housing 24 and the mounting fork 53 stop rotating and the motor 18 rotates the gear 20 clockwise, thus closing the ball valve 50. When the motor 18 turns in the opposite direction, the support housing 24 and the mounting fork 53 rotate counter-clockwise until the left prong 57 of the mounting fork 53 contacts the upstream pipe 14. Once the left prong 57 of the mounting fork 53 contacts the upstream pipe 14, the support housing 24 and the mounting fork 53 stop rotating and the motor 18 rotates the gear 20 counter-clockwise, thus opening the ball valve 50.

Figure 3:
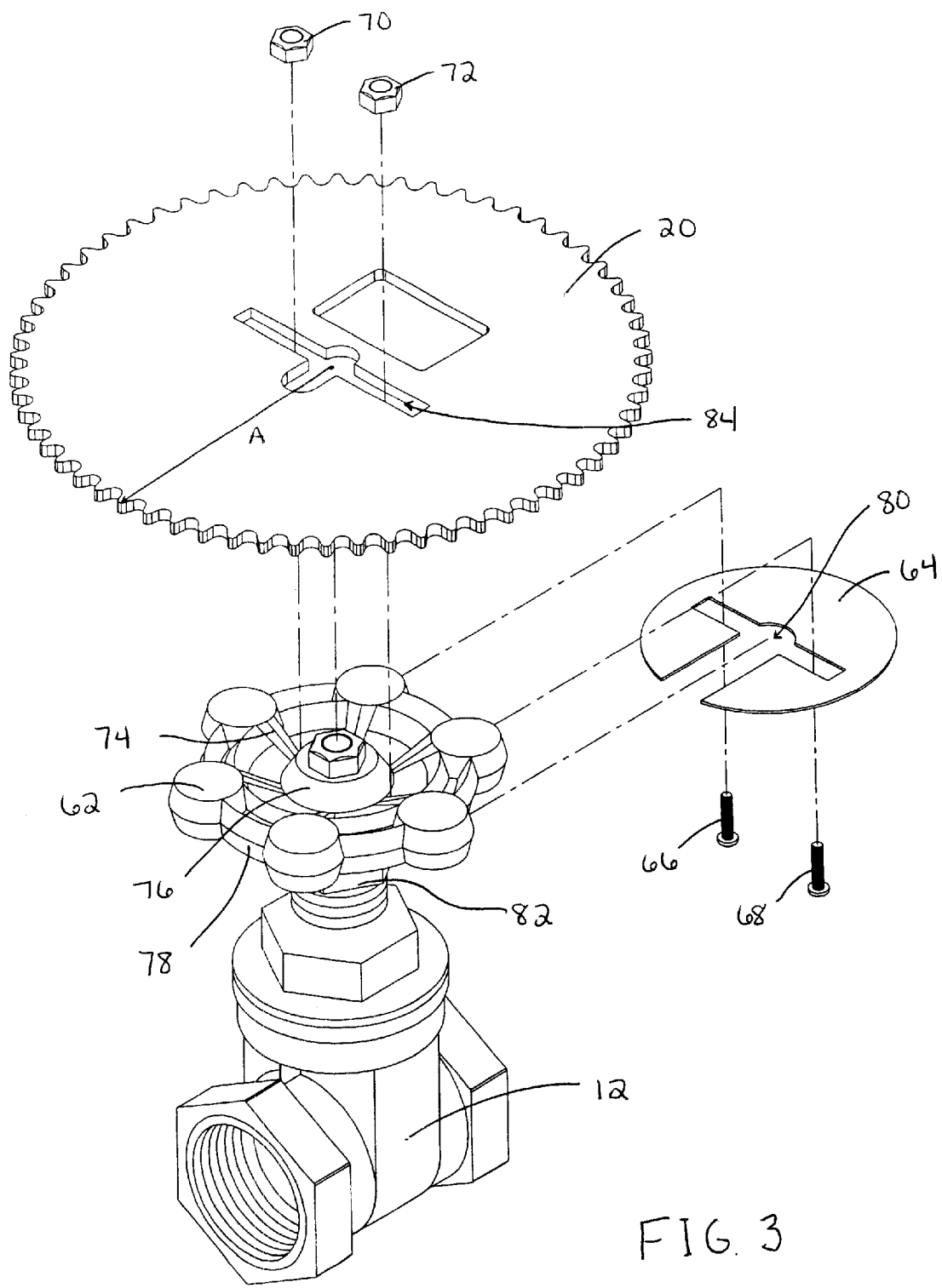
FIG. 3 is an exploded perspective view of a gate valve, gear, mounting plate of the device of the present invention.

FIG. 3 illustrates how the gear 20 can be coupled to the gate valve handle 62. A mounting plate 64 is positioned beneath the gate valve handle 62 for coupling the gear 20 to the gate valve handle 62 using two bolts 66 and 68 and two nuts 70 and 72. The gate valve handle 62 has a plurality of spokes 74 connecting the inner portion 76 of the gate valve handle 62 to the outer portion 78 of the gate valve handle. As shown, the mounting plate 64 is generally circular, with a cutout portion 80 configured to fit around a gate valve stem 82 such that the mounting plate 64 can be mounted concentrically with the gate valve handle 62 and gear 20. The mounting plate 64 can be constructed from metal or plastic as long as the mounting plate 64 is strong enough to operate under the torque conditions generated by the drive unit 10. The cutout portion 80 of the mounting plate 64 is also configured to allow the bolts 66 and 68 to secure the mounting plate 64 to the gate valve handle 62 and the gear 20.

The bolts 66 and 68 extend through the cutout portion 80 in the mounting plate 64, through the spaces between the spokes 74 of the gate valve handle 62, and through a cutout portion 84 in the gear 20 configured for mounting the bolts 66 and 68 and the nuts 70 and 72.

Rotation of the gate valve handle 62 in a first direction rotates the gate valve stem 82 in the same first direction and causes the gate valve 12 to open. Rotation of the gate valve handle 62 in a second direction rotates the gate valve stem 82 in the same second direction and causes the gate valve 12 to close. When mounted as described above, the gear 20 and the gate valve handle 62 rotate together through a uniform degree of rotation to operate the gate valve 12. Thus, using a gear 20 with a greater diameter A allows a lower torque motor 18 to be utilized to operate the gate valve 12. The drive unit 10 shown in FIG. 3 utilizes a 62 tooth gear 20 coupled to a 10 tooth motor 18 utilizing a 5.6 to 1 gear ratio. The gear ratio was selected to produce at least approximately 9 inch-pounds of torque, an amount of torque sufficient to operate most valves 12, 50. If the bolts 66 and 68 and nuts 70 and 72 loosen such that the gear 20 rotates without rotating the gate valve handle 62, the spokes 74 will engage the bolts 66 and 68 after some degree of rotation and cause the gear 20 and the gate valve handle 62 to rotate through a uniform degree of rotation.

Figure 4:
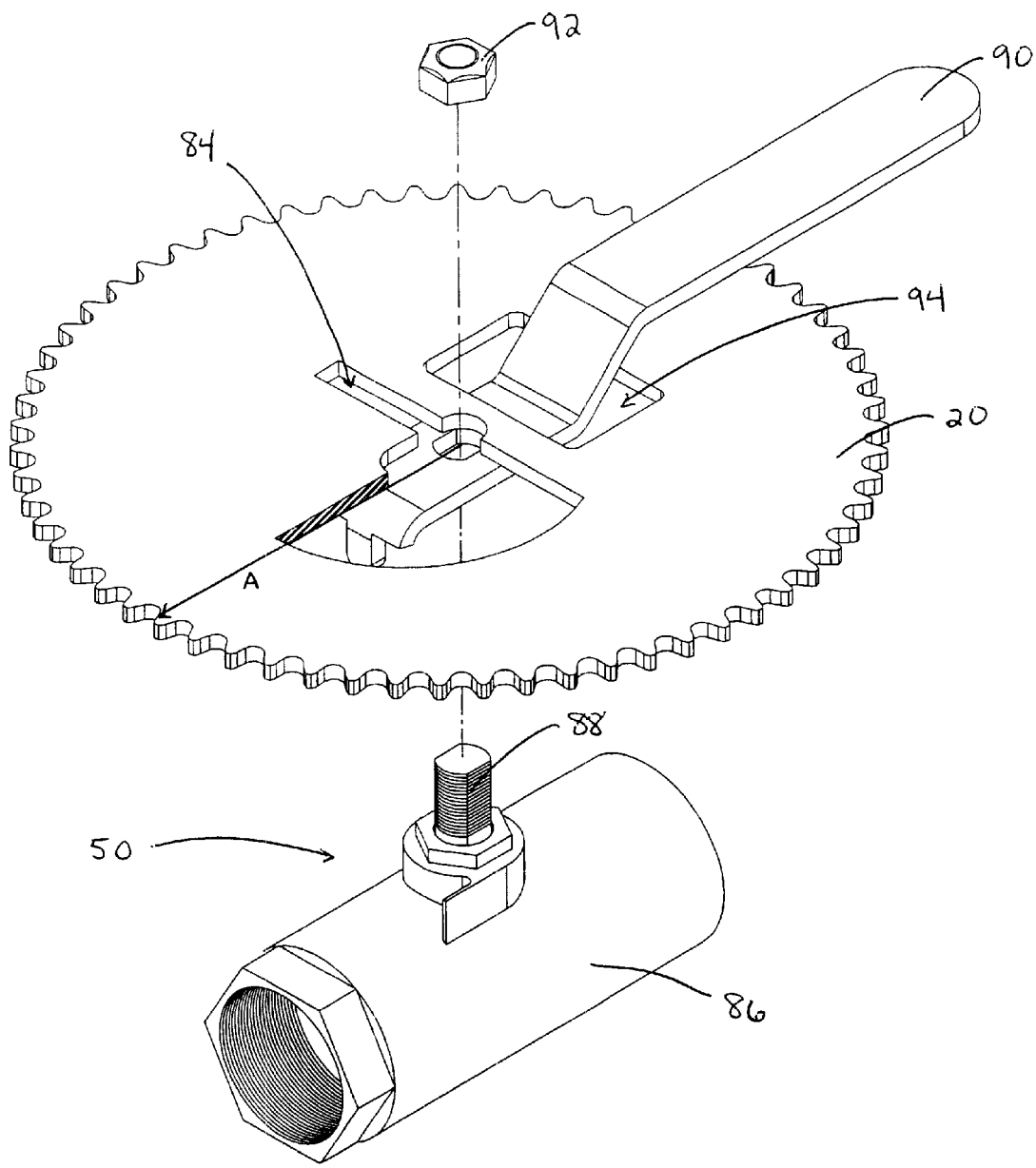
FIG. 4 is an exploded perspective view of a ball valve and the gear of the present invention.

FIG. 4 illustrates how the gear 20 can be coupled to the ball valve 50. The ball valve 50 includes a valve portion 86, a ball valve stem 88, a ball valve handle 90, and a mounting nut 92. Rotation of the ball valve stem 88 in a first direction opens the ball valve 50 and rotation of the ball valve stem 88 in a second direction closes the ball valve 50. The ball valve handle 90 operates the ball valve stem 88. The gear 20 includes a ball valve handle cutout portion 94. The gear 20 includes the cutout portion 84 as shown in FIG. 3; however, a cut-away section of the gear 20 has been drawn in FIG. 4 to provide a clearer view of the assembly of the ball valve handle 90.

To mount the gear 20 to the ball valve 50, the ball valve handle 90 can be removed from the ball valve stem 88. The ball valve handle 90 then fits through the ball valve handle cutout portion 94 of the gear 20. The ball valve stem 88 then fits through the ball valve handle 90 and the cutout portion 84 of the gear 20. Finally, the nut 92 secures the gear 20 to the ball valve stem 88, and the ball valve handle 90.

Once secured, the gear 20, the ball valve stem 88, and the ball valve handle 90 rotate together through a uniform degree of rotation. Thus, using a gear 20 with a greater diameter A allows a lower torque motor 18 to be utilized to operate the ball valve 50. The drive unit 10 shown in FIG. 4 utilizes a 62 tooth gear 20 coupled to a 10 tooth motor 18 utilizing a 5.6 to 1 gear ratio. The gear ratio was selected to produce at least approximately 9 inch-pounds of torque, an amount of torque sufficient to operate most valves 12, 50. If the nut 92 loosens such that the gear 20 rotates without rotating the ball valve stem 88, the gear 20 will engage the ball valve handle 90 after some degree of rotation and cause the gear 20, the ball valve handle 90, and the ball valve stem 88 to rotate through a uniform degree of rotation.

Although FIG. 1 shows a mounting band 46 used in conjunction with a gate valve 12 and FIG. 2 shows a mounting fork 53 used in conjunction with a ball valve 50, either the mounting band 46 or the mounting fork 53 may be utilized in conjunction with either the gate valve 12 or the ball valve 50. The same motorized drive unit 10 is used as well.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A motorized drive unit for operating a valve having a valve stem and a handle comprising:
   a motor assembly including a motor, and a first gear coupled to the motor and driven by the motor;
   a second gear having a mounting portion for mounting said second gear to the valve handle, wherein said second gear is coupled to said first gear such that said second gear is driven by said first gear; and
   a rotation-limiting piece mounted to said motor assembly for limiting rotation of said motor assembly around the axis of the valve stem and allowing said motor assembly to translate in unison with the valve stem and handle in other directions.

2. The motorized drive unit of claim 1 wherein said rotation-limiting piece is a band.

3. The motorized drive unit of claim 1 wherein said rotation-limiting piece is a mounting fork.

4. The motorized drive unit of claim 1 wherein said motor is a low torque motor and includes an axle and a sprocket.

5. The motorized drive unit of claim 1 wherein said motor drives said second gear such that at least approximately 9 inch-pounds of torque are generated by said second gear.

6. The motorized drive unit of claim 1 further comprising a mounting plate for mounting said motor assembly to a gate valve handle.

7. The motorized drive unit of claim 1 wherein said second gear is configured for mounting to a gate valve handle.

8. A method for mounting a gear to a gate valve having a gate valve handle and a gate valve stem comprising the steps of:
   providing a first gear;
   providing a mounting plate;
   positioning said mounting plate beneath the handle of the gate valve;
   positioning said first gear above the handle of the gate valve;
   coupling said mounting plate to said first gear with the gate valve handle positioned between said mounting plate and said gear.

9. The method of claim 8 wherein the step of coupling said mounting plate to said gear further comprises coupling said mounting plate and said gear with nuts and bolts.

10. The method of claim 8 wherein the step of providing a mounting plate further comprises providing a mounting plate with a cutout portion for mounting said plate around the gate valve stem.

11. A motorized shutoff assembly for a water valve having a valve stem and valve handle comprising:
    a motor;
    an axle connected to said motor;
    a first sprocket connected to said axle;
    a second, driven sprocket coupled to said first sprocket;
    a housing assembly for mounting said motor, axle, first sprocket, and second sprocket, wherein said housing assembly is mounted to and supported by the valve handle such that said housing assembly moves in unity with the valve stem and valve handle during operation of the valve; and
    means for limiting rotation of said housing assembly around the axis of the valve stem.

12. The assembly of claim 11 wherein said means for limiting rotation is a band attached to said housing.

13. The assembly of claim 11 wherein said means for limiting rotation is a fork attached to said housing.

14. The assembly of claim 11 wherein said motor drives said second sprocket such that at least approximately 9 inch-pounds of torque are generated by said second sprocket.

15. The assembly of claim 11 wherein said housing assembly further comprises a mounting plate for mounting the assembly to the valve handle.

16. The assembly of claim 11 wherein said housing assembly is configured for mounting to a gate valve handle.

* * * * *